United States Patent [19]

Gutner

[11] 4,074,377
[45] Feb. 21, 1978

[54] BED CANOPY FRAME

[76] Inventor: Kenneth H. Gutner, 3285 Dato, Highland Park, Ill. 60035

[21] Appl. No.: 703,618

[22] Filed: July 8, 1976

[51] Int. Cl.² .......................................... A47C 29/00
[52] U.S. Cl. ........................................ 5/362; 5/113; 135/5.1; 182/228; 403/244; 403/245
[58] Field of Search ............... 135/DIG. 9, 5.2, 5.1, 135/5.3; 5/362, 113; 403/167, 186, 408, 245, 244, 263; 52/690; 182/228, 46

[56] References Cited

U.S. PATENT DOCUMENTS

| 848,114 | 3/1907 | Medart | 403/167 |
| 1,662,768 | 3/1928 | Wait | 403/263 |
| 2,966,229 | 12/1960 | Frezieres | 182/46 |
| 3,119,435 | 1/1964 | Greenman | 182/278 |
| 3,426,867 | 2/1969 | Berger | 182/46 |
| 3,481,428 | 12/1969 | Merrit et al. | 182/46 |
| 3,741,225 | 6/1973 | Gunter | 5/362 |

FOREIGN PATENT DOCUMENTS

| 89,530 | 1/1966 | France | 403/167 |

Primary Examiner—Paul R. Gilliam
Assistant Examiner—Alex Grosz
Attorney, Agent, or Firm—Tilton, Fallon, Lungmus & Chestnut

[57] ABSTRACT

A bed canopy frame having longitudinal members constructed of resilient plastic material. The longitudinal members include parallel top and bottom portions with a transverse portion joining the top and bottom portions. The transverse portion of each of the longitudinal members includes a plurality of receptacles adapted to receive a corresponding number of lateral members. The lateral members cooperate with the longitudinal members to form a generally rectangular frame.

10 Claims, 10 Drawing Figures

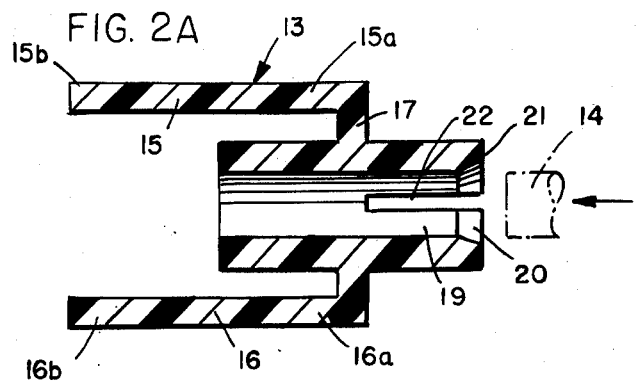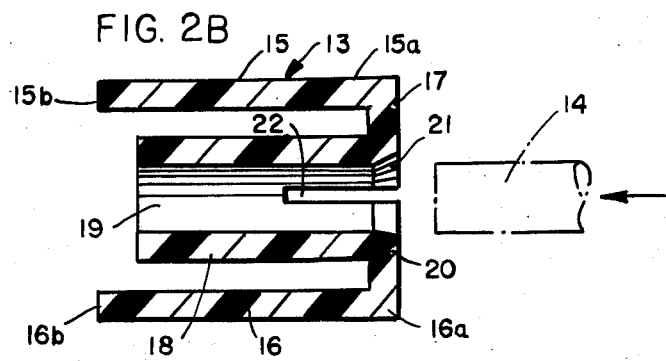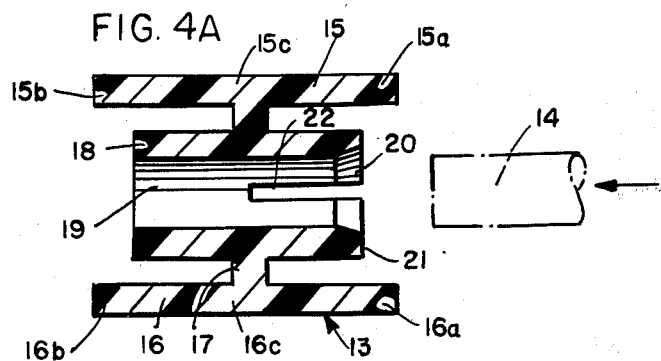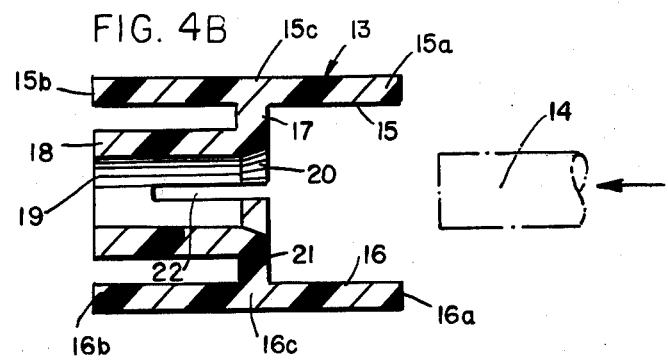

BED CANOPY FRAME

BACKGROUND AND SUMMARY

The present invention is a variation of the bed canopy frame described in my prior U.S. Pat. No. 3,741,225. The frame in that patent included two longitudinally extending members having bottom and side walls to provide open topped channel-shaped cross-sections wherein the longitudinally extending members were cross-connected by a plurality of longitudinally spaced transversely extending rods in receptacles provided for that purpose. The arrangement of the parts in my prior patent proved to be effective but I have now found it advantageous to change certain features in the longitudinal members which bring about enhanced effectiveness in manufacture, installation and usage.

The present invention provides a bed canopy frame comprising two longitudinal members, each of such members preferably containing two sub-members, and a plurality of lateral members which are adapted to be connected to the longitudinal members to form a generally rectangular frame. The longitudinal members form arched sides of the frame and are constructed of resilient plastic material. Each of the longitudinal members has parallel top and bottom portions joined by a transverse portion. The longitudinal members are equipped with receptacles for securing the ends of the lateral members in releasably adjustable fashion.

The receptacles are in the form of blocks which are integral with the transverse portions of the longitudinal members. Each of the blocks has a bore therethrough and through the transverse portion for receiving an end of one of the lateral members wherein the lateral member is a rod and the bore is of circular cross-section having a diameter no greater than the diameter of the rod. The blocks include slot means communicating with the bores to permit the bores to be enlarged upon receiving the rods.

The new construction provides a bed canopy frame having substantial strength characteristics while at the same time having a wide range of lateral adjustability. It is especially well adapted for use with beds that may depart somewhat from nominal width and with lateral members that may also differ slightly one from another in diameter and length dimensions. Other advantages and distinctive features of the new bed canopy frame can be appreciated from the details of construction set forth in the accompanying specifications, claims and drawings.

DETAILED DESCRIPTION OF INVENION

The invention is described in conjunction with the accompanying drawings in which:

FIG. 2a is an enlarged fragmentary cross-sectional view of a variation of the longitudinal member of FIG. 2;

FIG. 2b is an enlarged fragmentary cross-sectional view of another variation of the longitudinal member of FIG. 2;

FIG. 4a is an enlarged cross-sectional view of a variation of the longitudinal member of FIG. 4;

FIG. 4b is an enlarged cross-sectional view of another variation of the longitudinal member of FIG. 4.

Figure 1:
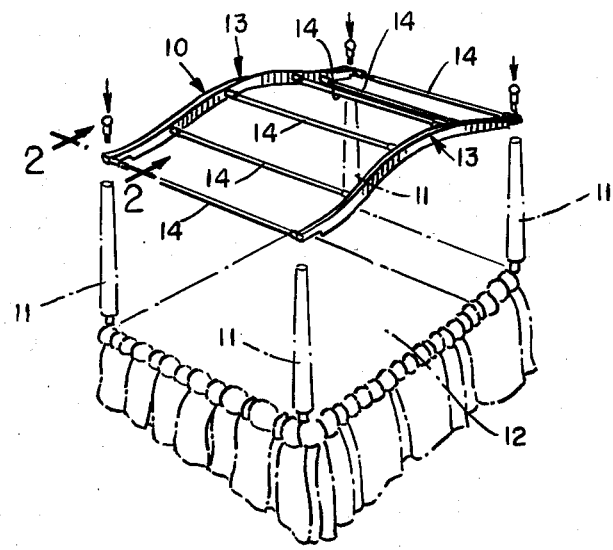
FIG. 1 is a perspective view of a bed canopy frame in accordance with the present invention shown associated with a bed in phantom line.

In the illustration given and with reference first to FIG. 1, the numeral 10 designates generally the bed canopy frame of the present invention. The bed canopy frame 10 is shown installed on upstanding bed posts 11. The bed posts 11 are provided at the four corners of the frame of a standard bed 12.

As indicated in my prior U.S. Pat. Nos. 3,311,118 and 3,741,225, beds come in nominal sizes of about 39 inches wide and 54 inches wide. There is no exact standard for width, however, since manufacturers often depart from the nominal widths over a range of 2 inches. The bed canopy frame of the present invention is adjustable in its width to accommodate such departures from nominal size.

The generally rectangular frame 10 includes two longitudinal members 13 which can, if desired, be made up of two telescopically interconnected sub-members. Each of the longitudinal members 13 forms an arched side of the frame 10 and are constructed of resilient plastic material. The frame 10 also includes a plurality of lateral members 14 adapted to be interconnected adjacent the ends thereof to the longitudinal members 13 to form the generally rectangular frame 10.

Figure 3:
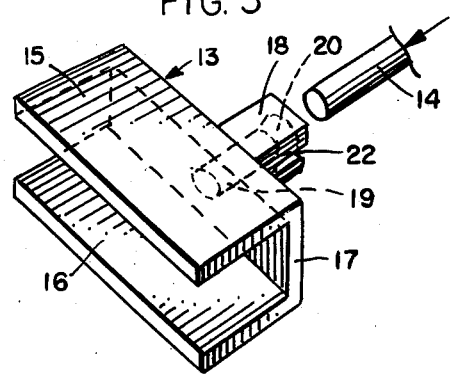
FIG. 3 is an enlarged fragmentary perspective view of the longitudinal member of FIG. 2.
Figure 5:
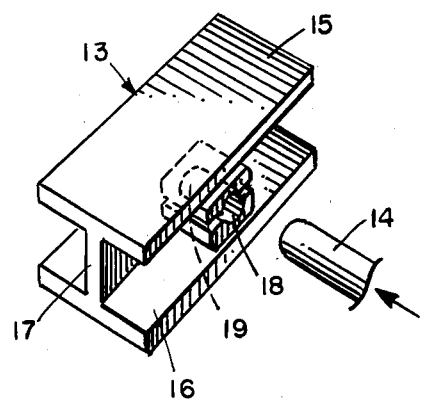
FIG. 5 is an enlarged perspective view of the longitudinal member of FIG. 4.

Referring to FIGS. 3 and 5, the configuration of the longitudinal members 13 can be better understood. The longitudinal members 13 each have a top portion 15 which is parallel to the bottom portion 16. The top portion 15 and the bottom portion 16 are joined by a transverse portion 17. The transverse portion 17 of the longitudinal members 13 is preferably perpendicular to the top portion 15 and the bottom portion 16.

The longitudinal members 13 are equipped with a plurality of receptacles 18 adapted to receive and secure the ends of the lateral members 14 in releasably adjustable fashion. The receptacles 18 are each provided in the form of a block which is integral with the transverse portion 17 of an associated longitudinal member 13. A continuous bore 19 extends through both the transverse portion 17 and the block 18 and the bore 19 is adapted to receive the end of an associated lateral member 14. The receptacles 18 are preferably included at the ends of the longitudinal members 13 as well as at corresponding positions intermediate to the ends of the longitudinal members 13 to provide the generally rectangular configuration of the frame 10.

Figure 2:
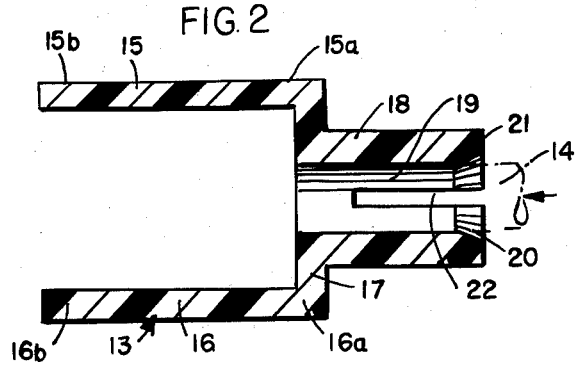
FIG. 2 is an enlarged fragmentary cross-sectional view of a longitudinal member of the frame.
Figure 4:
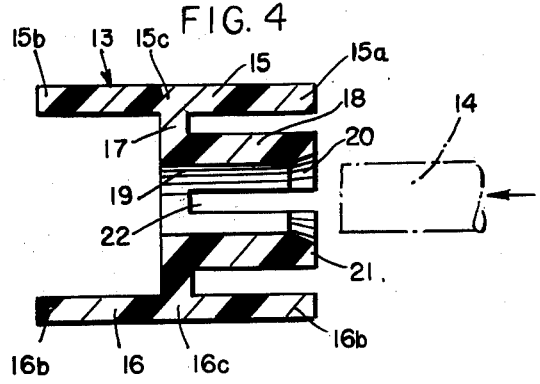
FIG. 4 is an enlarged cross-sectional view of a longitudinal member of the frame.

The lateral member 14 is a rod (as shown in FIGS. 3 and 5) which can suitably be a hollow metal tube to keep weight and expense at a minimum. The bore 19 has a circular cross-section to conform essentially to the diameter of the associated rod 14 and includes an initial flared portion 20 (as shown in FIGS. 2 and 4) to facilitate entry of the rod 14 into the bore 19. However, the diameter of the bore 19 is no greater than the diameter of the rod 14 in order to insure a tight fit.

The block or receptacle 18 is also provided with slot means in the form of a slot 22. In order to provide ease of insertion of the rod 14 into the bore 19, the slot 22 communicates with the bore 19 to permit bore enlargement upon receiving the rod 14. The slot 22 extends from the face 21 of the block or recepatacle 18 a substantial distance in the direction of the bore 19.

The longitudinal members 13 can be formed having one of two configurations both employing similar structural concepts. the first embodiment (as shown in FIG. 2) includes a top portion 15, a bottom portion 16, and a transverse portion 17. The top portion 15 is parallel to the bottom portion 16 and they are joined at corresponding ends 15a and 16a thereof by a tansverse portion 17. The transverse portion 17 is preferably perpendicular to both the top portion 15 and the bottom portion 16 to provide the longitudinal member 13 with a generally U-shaped cross section.

The first embodiment of the longitudinal member 13 includes a plurality of longitudinally spaced blocks or receptacles 18 of substantially identical construction integral with the transverse portion 17. Each of the blocks or receptacles 18 has a bore 19 of circular cross-section extending therethrough and through the transverse portion 17 and further has a slot 22 communicating with the bore 19. The blocks or receptacles 18 are perpendicular to the transverse portion 17 and parallel to the top portion 15 and the bottom portion 16 of the longitudinal member 13.

The blocks or receptacles 18 associated with the first embodiment of the longitudinal member 13 (as shown in FIGS. 2, 2a and 2b) can be placed in various positions along the axes of the bores 19 with respect to the transverse portion 17. The blocks or receptacles 18 can extend away from the transverse portion 17 in a single direction (as shown in FIG. 2) to provide maximum width adjustment for accommodating beds departing substantially from nominal size. The rods 14 can then be inserted into the bores 19 and, if necessary, completely through the U-shaped cross-section of the longitudinal member 13. The rods 14 should, however, ordinarily not extend beyond the ends 15b and 16b of the top portion 15 and the bottom portion 16 respectively in order to avoid interference with the draping of the canopy over the longitudinal member 13.

The blocks or receptacles 18 can likewise extend away from the transverse portion 17 in a single direction (as shown in FIG. 2b) to provide substantial strength characteristics as well as width adjustment for accommodating beds departing somewhat from nominal size. The rods 14 can then be inserted into the bores 19 and, if necessary, completely through the U-shaped cross-section of the longitudinal member 13. However, the rods 14 should again ordinarily not extend beyond the ends 15b and 16b of the top portion 15 and the bottom portion 16 respectively.

The blocks or receptacles 18 can also extend away from the transverse portion 17 in opposite directions (as shown in FIG. 2a) to provide maximum strength characteristics as well as substantial width adjustment for accommodating beds departing from nominal size. The rods 14 can then be inserted into the bores 19 and, if necessary, completely through the U-shaped cross-section of the longitudinal member 13. The rods 14 once again, however, should ordinarily not extend beyond the ends 15b and 16b of the top portion 15 and the bottom portion 16 respectively in order to avoid interference with the draping of the canopy over the longitudinal member 13.

The second embodiment of the longitudinal member 13 (as shown in FIG. 4) likewise includes a top portion 15, a bottom portion 16, and a transverse portion 17. The top portion 15 is parallel to the bottom portion 16 but they are joined at corresponding intermediate locations 15c and 16c rather than at corresponding ends 15a and 16a thereof as before. The transverse portion 17 is perpendicular to both the top portion 15 and the bottom portion 16 to provide the longitudinal member 13 with a generally I-shaped cross-section.

The second embodiment of the longitudinal member 13 similarly includes a plurality of longitudinally spaced blocks or receptacles 18 of substantially identical construction integral with the transverse portion 17. Each of the blocks or receptacles 18 again has a bore 19 of circular cross-section extending therethrough and through the transverse portion 13 and further has a slot 22 communicating with the bore 19. The blocks or receptacles 18 are similarly perpendicular to the transverse portion 17 and parallel to the top portion 15 and the bottom portion 16 of the longitudinal member 13.

The blocks or receptacles 18 associated with the second embodiment of the longitudinal member 13 (as shown in FIGS. 4, 4a and 4b) can likewise be placed in various positions along the axes of the bores 19 with respect to the transverse portion 17. The blocks or receptacles 18 can extend away from the transverse portion 17 in a single direction (as shown in FIG. 4) to provide maximum width adjustment for accommodating beds departing substantially from nominal size. The rods 14 can then be inserted into the bores 19, and, if necessary, completely through the I-shaped cross-section of the longitudinal member 13. The rods 14 should, however, ordinarily not extend beyond the ends 15b and 16b of the top portion 15 and the bottom portion 16 respectively in order to avoid interference with the draping of the canopy over the longitudinal member 13.

The blocks or receptacles 18 can likewise extend away from the transverse portion 17 in a single direction (as shown in FIG. 4b) to provide substantial strength characteristics as well as width adjustment for accommodating beds departing somewhat from nominal size. The rods 14 can then be inserted into the bores 19 and, if necessary, completely through the bores 19. However, the rods 14 should again ordinarily not extend beyond the ends 15b and 16b of the top portion 15 and the bottom portion 16 respectively.

The blocks or receptacles 18 can also extend away from the transverse portion 17 in opposite directions (as shown in FIG. 4a) to provide maximum strength characteristics as well as substantial width adjustment for accommodating beds departing from nominal size. The rods 14 can then be inserted into the bores 19 and, if necessary, completely through the I-shaped cross-section of the longitudinal member 17. The rods 14 once again, however, should ordinarily not extend beyond the ends 15b and 16b of the top portion 15 and the bottom portion 16 respectively in order to avoid interference with the draping of the canopy over the longitudinal member 13.

In both embodiments employing the structural concepts of the present invention (as shown in FIGS. 2 and 4) the transverse portions 17 support the blocks or receptacles 18. The transverse portions 17 terminate in top and bottom portions 15 and 16 respectively which provide the substantial strength characteristics normally associated with U-shaped channels and I-shaped beams. The location of the blocks or receptacles 18 can be varied as discussed above with respect to the U-shaped cross-section or I-shaped cross-section of the longitudinal members 13 depending upon structural requirements and objectives of a particular bed canopy frame.

While in the foregoing specification a detailed description of the invention has been set forth for the purpose of illustration, variations of the details herein given may be made by those skilled in the art without departing from the spirit and scope of the invention.

I Claim:

1. A bed canopy frame comprising two longitudinal members and a plurality of lateral members adapted to be interconnected adjacent the ends thereof to said longitudinal members to form a generally rectangular frame, each of said longitudinal members forming an arched side of said frame and being constructed of resilient plastic material and each of said longitudinal members having parallel top and bottom portions with a transverse portion joining said top and bottom portions, said longitudinal members being equipped with a plurality of receptacles for securing the ends of said lateral members in releasably adjustable fashion, each of said receptacles being a block integral with said transverse portion of an associated longitudinal member, said transverse portion and said block having a bore therethrough for receiving the end of an associated lateral member, said lateral members being rods and said bores being of circular cross-section with a diameter no greater than the diameter of said rods, and slot means in said blocks communicating with said bores to permit bore enlargement upon receipt of said rods.

2. The structure of claim 1 in which said transverse portion of said longitudinal member is perpendicular to said top and bottom portions.

3. The structure of claim 2 in which said top and bottom portions are joined at corresponding ends thereof by said transverse portion to provide said longitudinal member with a generally U-shaped cross-section.

4. The structure of claim 3 in which said block of said receptacle is perpendicular to said transverse portion and parallel to said top and bottom portions.

5. The structure of claim 4 in which said block of said receptacle extends away from said transverse portion of said longitudinal member in a single direction.

6. The structure of claim 4 in which said block of said receptacle extends away from said transverse portion of said longitudinal member in opposite directions.

7. The structure of claim 2 in which said top and bottom portions are joined at corresponding intermediate locations by said transverse portion to provide said longitudinal member with a generally I-shaped cross-section.

8. The structure of claim 7 in which said block of said receptacle is perpendicular to said transverse portion and parallel to said top and bottom portions.

9. The structure of claim 8 in which said block of said receptacle extends away from said transverse portion of said longitudinal member in a single direction.

10. The structure of claim 8 in which said block of said receptacle extends away from said transverse portion of said longitudinal member in opposite directions.

* * * * *